(12) United States Patent
Kim

(10) Patent No.: US 11,571,817 B2
(45) Date of Patent: Feb. 7, 2023

(54) MOBILE ROBOT AND METHOD FOR OPERATING THE SAME

(71) Applicant: LG ELECTRONICS INC., Seoul (KR)

(72) Inventor: Tae Hyun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 458 days.

(21) Appl. No.: 16/703,519

(22) Filed: Dec. 4, 2019

(65) Prior Publication Data

US 2021/0008726 A1 Jan. 14, 2021

(30) Foreign Application Priority Data

Jul. 11, 2019 (KR) .................. 10-2019-0084013

(51) Int. Cl.
  *B25J 11/00* (2006.01)
  *G06N 20/00* (2019.01)
  *G05D 1/02* (2020.01)
  *B60W 60/00* (2020.01)
  (Continued)

(52) U.S. Cl.
  CPC ......... *B25J 11/0085* (2013.01); *B25J 13/006* (2013.01); *B25J 19/023* (2013.01); *B60W 60/001* (2020.02); *G05D 1/0246* (2013.01); *G05D 1/0276* (2013.01); *G06N 20/00* (2019.01); *B60W 2420/42* (2013.01); *B60W 2556/10* (2020.02); *B60W 2556/45* (2020.02)

(58) Field of Classification Search
  CPC .... B25J 11/0085; B25J 13/006; B25J 19/023; B25J 9/0003; B25J 9/1633; B25J 9/1664; B25J 13/08; B60W 60/001; B60W 2420/42; B60W 2556/10; B60W 2556/45; G05D 1/0246; G05D 1/0276; G05D 1/0282; G05D 1/0274; G05D 2201/0203; G06N 20/00; A47L 9/28
  See application file for complete search history.

(56) References Cited

U.S. PATENT DOCUMENTS

2018/0360282 A1* 12/2018 Erkek .................. A47L 9/2894

FOREIGN PATENT DOCUMENTS

KR 1020050119815 12/2005
KR 100821162 4/2008

* cited by examiner

*Primary Examiner* — Peter D Nolan
*Assistant Examiner* — Ashley L Redhead, Jr.
(74) *Attorney, Agent, or Firm* — Lee, Hong, Degerman, Kang & Waimey

(57) ABSTRACT

A mobile robot, capable of communicating with neighboring devices in a 5G communication environment and capable of efficient cleaning via machine learning based on such communication, comprises a main body configured to move in the movement space, a driving unit mounted on the main body to move the main body, a receiving unit configured to receive moving history information of a user robot that has been moved by a user in the movement space, a memory in which a computer-readable program and map information of the movement space are stored, and a control unit configured to communicate with the receiving unit, the memory, and the driving unit to control the main body, wherein the control unit establishes a moving area of the mobile robot based on the moving history information of the user robot received by the receiving unit.

18 Claims, 9 Drawing Sheets

(51) Int. Cl.
*B25J 13/00* (2006.01)
*B25J 19/02* (2006.01)

MOBILE ROBOT AND METHOD FOR OPERATING THE SAME

CROSS-REFERENCE TO RELATED APPLICATION

Pursuant to 35 U.S.C. § 119(a), this application claims the benefit of earlier filing date and right of priority to Korean Patent Application No. 10-2019-0084013, filed on Jul. 11, 2019, the contents of which are hereby incorporated by reference herein in its entirety.

BACKGROUND

Field of the Invention

The present disclosure relates to a mobile robot and a method for operating the mobile robot, and more particularly, to a mobile robot and a method which allows an autonomous mobile robot to move in a movement space based on a moving history of a user robot that previously moved in the movement space.

Description of Related Art

The following description is only for the purpose of providing background information related to embodiments of the present disclosure, and the contents to be described do not necessarily constitute related art.

Robots have been developed for industrial use and were partially responsible for factory automation. In recent years, the field of applications for robots has been further expanded to, for example, medical robots and aerospace robots. In addition, household robots that may be used in ordinary homes are being developed. Among these robots, a robot capable of autonomously moving is called a mobile robot.

An example of a mobile robot used in a home may be a cleaning robot. This cleaning robot is a device for cleaning a certain area by suctioning dust or foreign matter around the cleaning robot while autonomously moving in that area.

The cleaning robot is a device that performs a task while autonomously moving in a predetermined area. However, since a general cleaning robot is not capable of confirming the information on the area that it has cleaned, cleaning is performed according to a predetermined pattern. Accordingly, a conventional cleaning robot may repeatedly clean an area that has already been cleaned, thus reducing cleaning efficiency.

In addition, an example of a user robot used in a home may be a wired or wireless vacuum cleaner. This wired or wireless vacuum cleaner is a device operated by a user for suctioning dust or foreign matter in a surrounding area.

As such, since the user robot suctions dust or foreign matter around the area that the user moves, there may be a space that did not get cleaned due to the user's mistake or an obstacle such as furniture or an object placed in the space that is being cleaning. Accordingly, the space that did not get cleaned should get cleaned again.

Accordingly, there is a need for a technology that allows a cleaning robot to clean a space that has not been cleaned or a space that should be cleaned again after the space has been cleaned by a user robot according to a request from the user.

As an example of a mobile robot allowing a cleaning robot to clean, by establishing a cleaning pattern through a user, Korean Patent Registration No. 10-0821162, entitled "Control method and system of cleaning robot," discloses that by establishing a cleaning area according to a user instruction, an area that should be cleaned may get cleaned preferentially.

The above-mentioned document describes a technique for establishing a preferential cleaning area for the cleaning robot by using a user terminal, and allowing the cleaning robot to clean based on the set preferential cleaning area. However, the above-mentioned document does not specifically disclose a technique that allows the cleaning robot to clean a space that has not been cleaned or a space that should be cleaned again after the space has been cleaned by a user robot.

In addition, Korean Patent Application Publication No. 10-2005-0119815, entitled "Multi-mode cleaning robot," proposes a technology capable of automatic cleaning and manual cleaning according to a program selected by a user.

According to the above-mentioned document, automatic cleaning can be performed according to a given program for autonomous cleaning, a user can do cleaning from a distance by using a remote control, or cleaning can be done by the user while using a vacuum cleaner in manual mode.

That is, the above-mentioned document proposes a technology capable of automatic or manual cleaning according to a condition selected by the user. However, a technology that allows a cleaning robot to clean a space that has not been cleaned or a space that should be cleaned again after the space has already been cleaned by a user robot is not specifically disclosed.

Accordingly, there is a need for a method that allows a cleaning robot to autonomously clean a space that has not been cleaned or a space that should be cleaned again after the space has already been cleaned by a user robot.

The background art described above may be technical information retained by the present inventors in order to derive the present disclosure or acquired by the present inventors during the process of deriving the present disclosure, and thus is not necessarily a known art disclosed to the general public before the filing of the present application.

RELATED ART DOCUMENTS

Patent Documents

Related Art 1: Korean Patent Application Publication No. 10-2005-0119815 (2005 Dec. 22.)
Related Art 2: Korean Patent Registration No. 10-0821162 (2008 Apr. 3.)

SUMMARY OF THE INVENTION

One embodiment of the present disclosure provides a mobile robot that may automatically clean an area that a user did not clean or an area that needs to be cleaned again after having already been cleaned by the user.

In addition, another embodiment of the present disclosure is to enable a cleaning of a movement space through an interaction between an autonomous mobile robot and a user robot, thereby allowing even cleaning of the entire space.

Still another embodiment of the present disclosure is to provide the autonomous mobile robot for acquiring a map of the entire movement space, and after the user robot cleans the movement space, may extract an area that the user could not clean or an area that needs to be cleaned from the acquired map of the movement space. Accordingly, the movement space may be entirely cleaned.

Still another embodiment of the present disclosure provides that when the autonomous mobile robot acquires the map of the entire movement space, the mobile robot learns of an obstacle disposed in the movement space and excludes the learned obstacle from a cleaning area so that when the mobile robot cleans the movement space, the mobile robot may clean the movement space while avoiding the obstacle.

The objective of the present disclosure is not limited to the above-mentioned objectives and other objectives and aspects of the present disclosure which are not mentioned can be understood by the following description, and will be more clearly understood by the embodiments of the present disclosure. It is also to be understood that the objectives and aspects of the present disclosure may be realized by the means indicated in the claims and combinations thereof.

An embodiment of the present disclosure is directed to providing an apparatus capable of establishing a moving area of a mobile robot moving autonomously in a movement space, based on a moving history of a user robot that has been moved by a user in the movement space, in order to allow the mobile robot to move in the movement space.

Specifically, the mobile robot may include: a main body configured to move in the movement space; a driving unit mounted on the main body to move the main body; a receiving unit configured to receive moving history information of a user robot that has been moved by a user, in the movement space; a memory in which a computer-readable program and map information of the movement space are stored; and a control unit configured to communicate with the receiving unit, the memory, and the driving unit to control the main body.

Here, the control unit may establish the moving area of the mobile robot based on the moving history information of the user robot received by the receiving unit.

The mobile robot may move only in an area in which the user robot has not moved. Accordingly, as the mobile robot moves, in other words, cleans, only in the area in which the user robot did not move, in other words, not cleaned, the area that did not get cleaned may be cleaned, thus the movement space may be evenly cleaned.

In addition, the mobile robot may move from the position where the movement of the user robot had stopped, that is, the position where the cleaning had stopped.

According to an embodiment of the present disclosure, the receiving unit of the mobile robot moving autonomously in the movement space may receive a movement stoppage status of the user robot based on the map information, wherein the mobile robot may include a position measuring unit configured to establish a beginning of the moving area on the map based on the received movement stoppage status of the user robot.

In addition, according to an embodiment of the present disclosure, the control unit of the mobile robot moving autonomously in the movement space may determine whether the movement stoppage status of the user robot is received, and when the movement stoppage status of the user robot continues for more than a predetermined period of time from the time when the movement stoppage status was received, may cause the driving unit to move the main body to an area in which the user robot did not move, based on the moving history information.

The movement stoppage status of the user robot may be information of the user robot having not moved for more than the predetermined period of time from a specific time point. Here, when the moving history of the user robot does not become generated for more than the predetermined period of time from a specific time point, it may be determined that there is no occurrence of moving history of the user robot. This may make it possible to precisely measure the time when the mobile robot moves.

According to an embodiment of the present disclosure, the mobile robot may further include: a camera configured to photograph an external object, wherein the memory stores a machine learning model trained using a data set labeled for obstacles that restrict the movement of the main body, wherein the mobile robot may include: a determining unit configured to determine a route along which the main body may move in the moving area, by inputting an image of an object in the moving area photographed by the camera into the machine learning model, and wherein the control unit may control the driving unit such that the mobile robot moves along a movable route determined by the determining unit.

That is, when the mobile robot moves, it is possible to recognize an obstacle and move while avoiding the obstacle so that a collision between the mobile robot and the obstacle may be prevented.

According to an embodiment of the present disclosure, the mobile robot may further include a map acquiring unit configured to acquire the map information of the movement space based on the moving information of the main body in the movement space and a transmitting unit configured to transmit the map information to the user robot.

Meanwhile, a user robot that is moved by a user according to an embodiment of the present disclosure may include: a user robot main body; a user robot receiving unit configured to receive map information of a movement space from a mobile robot that generates the map information while moving autonomously in the movement space; a user robot memory in which a moving history of the user robot main body that has been moved by a user, in the movement space is stored based on the received map information of the movement space; and a user robot transmitting unit configured to transmit the information on the moving history of the user robot main body to the mobile robot when the movement of the user robot main body stops according to a predefined condition.

The user robot transmits, to the mobile robot, the information on the moving history of the user robot, and the mobile robot may establish a moving area based on the received moving history of the user robot.

According to an embodiment of the present disclosure, the predefined condition of the user robot may be defined as whether or not a movement stoppage status of the user robot continues for more than a predetermined period of time.

Here, according to an embodiment of the present disclosure, the user robot may further include a signal generating unit configured to generate a signal about the movement stoppage status of the user robot, which is transmissible to the mobile robot, when the movement stoppage status of the user robot continues for more than the predetermined period of time.

That is, it may be possible to precisely determine the time when the movement of the mobile robot starts.

According to an embodiment of the present disclosure, the signal generating unit of the user robot may further generate the information on a position where the movement stoppage status of the user robot occurred.

That is, by determining the position where the movement of the user robot stops, the mobile robot may start moving from the position where the movement of the user robot had stopped. As such, the cleaning efficiency of the mobile robot may be improved by cleaning around an area that needs to be cleaned.

A moving method of a mobile robot moving autonomously in a movement space according to an embodiment of the present disclosure may include: collecting and storing map information of the movement space in which the mobile robot moves; transmitting the map information to a user robot moved by a user; receiving a movement stoppage status of the user robot based on a moving history of the user robot that has previously moved in the movement space; and establishing a beginning of a moving area of the mobile robot on the map based on the received movement stoppage status of the user robot.

Here, the establishing the beginning of the moving area of the mobile robot may include detecting an obstacle placed in the moving area; and determining a movement route along which the mobile robot may move, based on a position of the detected obstacle.

As such, it is possible to clean a movement space that should be cleaned, through an interaction between an autonomous mobile robot and a movable user robot, thereby allowing uniform cleaning of the entire space that needs to be cleaned.

According to an embodiment of the present disclosure, the collecting and storing map information of a movement space of the moving method of a mobile robot may include storing a machine learning model trained using a data set labeled for obstacles that restrict the movement of the mobile robot, and wherein the establishing the beginning of the moving area of the mobile robot may include identifying the obstacle in the moving area based on the machine learning model and establishing a movement route to avoid the identified obstacle.

That is, the moving method of a mobile robot may provide learning an obstacle disposed and placed in the movement space, and excluding the learned obstacle from a cleaning area so that when the mobile robot cleans the movement space, the mobile robot may clean the movement space while avoiding the obstacle.

According to an embodiment of the present disclosure, the establishing the beginning of the moving area of the mobile robot may include estimating a position where the movement stoppage status of the user robot occurred, on the map of the movement space, based on the moving history of the user robot.

According to an embodiment of the present disclosure, the establishing the beginning of the moving area of the mobile robot may include determining whether the movement stoppage status of the user robot continues for more than a predetermined period of time; and when it is determined that the movement stoppage status continues for more than the predetermined period of time, moving the mobile robot to the position where the movement stoppage status occurred.

This may make it possible to precisely determine the time when the movement of the mobile robot starts.

A method for operating a user robot that is moved by a user according to an embodiment of the present disclosure may include: receiving map information of a movement space, which is acquired by a mobile robot while moving in the movement space autonomously; acquiring and storing a moving history of the user robot that has been moved by a user in the movement space, based on the received map information of the movement space; and transmitting the acquired moving history of the user robot to the mobile robot.

According to the method for operating a user robot, in a state in which an autonomous mobile robot acquires a map of the entire movement space, after the user robot cleans the movement space, it may be possible to extract an area that the user could not clean or an area that needs to be cleaned from the acquired map of the movement space. Accordingly, the movement space may be cleaned entirely.

According to the method for operating a user robot, the transmitting the acquired moving history of the user robot to the mobile robot may include determining whether the movement of the user robot stops according to a predefined condition.

In addition, according to the method for operating a user robot, the predefined condition may be defined as whether or not a movement stoppage status of the user robot continues for more than a predetermined period of time.

In addition, the method for operating a user robot may further include generating a signal informing a movement stoppage status of the user robot, which is to be transmitted to the mobile robot.

That is, when the moving history of the user robot does not become generated for more than the predetermined period of time from a specific time point, it is may be determined that the user robot has finished cleaning the movement space. As such, it may be possible to precisely determine the time when the mobile robot should start moving.

According to mobile robot comprising, a driving unit configured to move the mobile robot, a receiver configured to receive movement history information of a user robot in a movement space, a memory configured to store map information of the movement space and one or more controllers configured to determine at least one area in the movement space for moving the mobile robot based on the received movement history information of the user robot.

And according to user robot, comprising, a receiver configured to receive map information of a movement space from a mobile robot, wherein the map information is generated based on autonomous movement of the mobile robot in the movement space, a memory configured to store movement history of the user robot in the movement space based on the received map information and a transmitter configured to transmit the movement history to the mobile robot when movement of the user robot is stopped according to a predefined condition.

In addition, according to method for operating a mobile robot, the method comprising, storing map information of a movement space based on movement of the mobile robot in the movement space, transmitting the map information to a user robot operated by a user, receiving a movement stoppage status of the user robot including a movement history of the user robot in the movement space and determining a start location for moving the mobile robot based on the received movement stoppage status of the user robot.

According to method for operating a user robot, the method comprising, receiving map information of a movement space from a mobile robot, wherein the map information is generated based on autonomous movement of the mobile robot in the movement space, storing movement history of the user robot in the movement space based on the received map information and transmitting the movement history to the mobile robot when the movement of the user robot is stopped according to a predefined condition.

Other aspects and features other than those described above will become apparent from the following drawings, claims, and detailed description of the disclosure.

According to an embodiment of the present disclosure, an autonomous mobile robot may acquire map information of a movement space and transmit the acquired map information of the movement space to a user robot. Thereafter, after the user robot having stored the map information cleans the movement space, the user robot may transmit, to the mobile robot, the information on a space within the movement space in which the user robot has not moved, that is, a space that has not been cleaned, which is extracted in response to the acquired map information. Based on the transmitted information on the space that has not been cleaned, the mobile robot may suction, for example, foreign matter and garbage while moving in the space that has not been cleaned by the user robot, thereby minimizing the area that has not been cleaned in the movement space.

In addition, when the mobile robot cleans while moving in the movement space, it may be possible to prevent the mobile robot from colliding with obstacles in the movement space. Specifically, a machine learning model trained using a data set labeled for obstacles is stored in the mobile robot so that when the mobile robot is adjacent to an obstacle, the mobile robot may move while avoiding the obstacle, based on the stored data set.

The effects of the present disclosure are not limited to those mentioned above, and other effects not mentioned may be clearly understood by those skilled in the art from the following description.

DETAILED DESCRIPTION

Figure 1A:
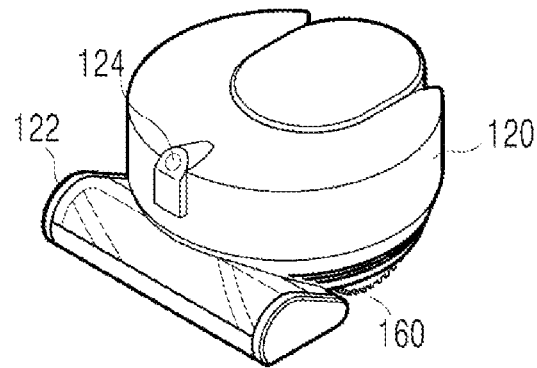
FIG. 1A is a diagram illustrating an embodiment showing a mobile robot.

Hereinafter the embodiments disclosed in this specification will be described in detail with reference to the accompanying drawings. The present disclosure may be embodied in various different forms and is not limited to the embodiments set forth herein. Hereinafter in order to clearly describe the present disclosure, parts that are not directly related to the description are omitted. However, in implementing an apparatus or a system to which the spirit of the present disclosure is applied, it is not meant that such an omitted configuration is unnecessary. In addition, like reference numerals are used for like or similar components throughout the specification.

In the following description, terms such as "first," "second," and the like may be used in describing various components, but the above components shall not be restricted to the above terms. The terms are only used to distinguish one component from the other. Also, in the following description, the articles "a," "an," and "the," include plural referents unless the context clearly dictates otherwise.

In the following description, it will be understood that terms such as "comprise," "include," "have," and the like are intended to specify the presence of stated feature, integer, step, operation, component, part or combination thereof, but do not preclude the presence or addition of one or more other features, integers, steps, operations, components, parts or combinations thereof.

Hereinafter, an autonomous mobile robot according to an embodiment of the present disclosure will be described in detail with reference to the drawings.

Figure 1B:
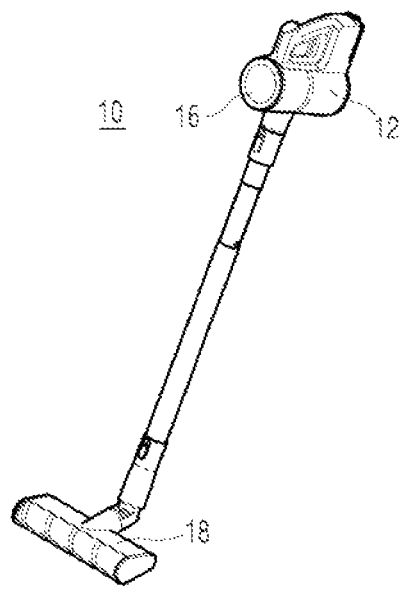
FIG. 1B is a diagram illustrating an embodiment showing a user robot.
Figure 2:
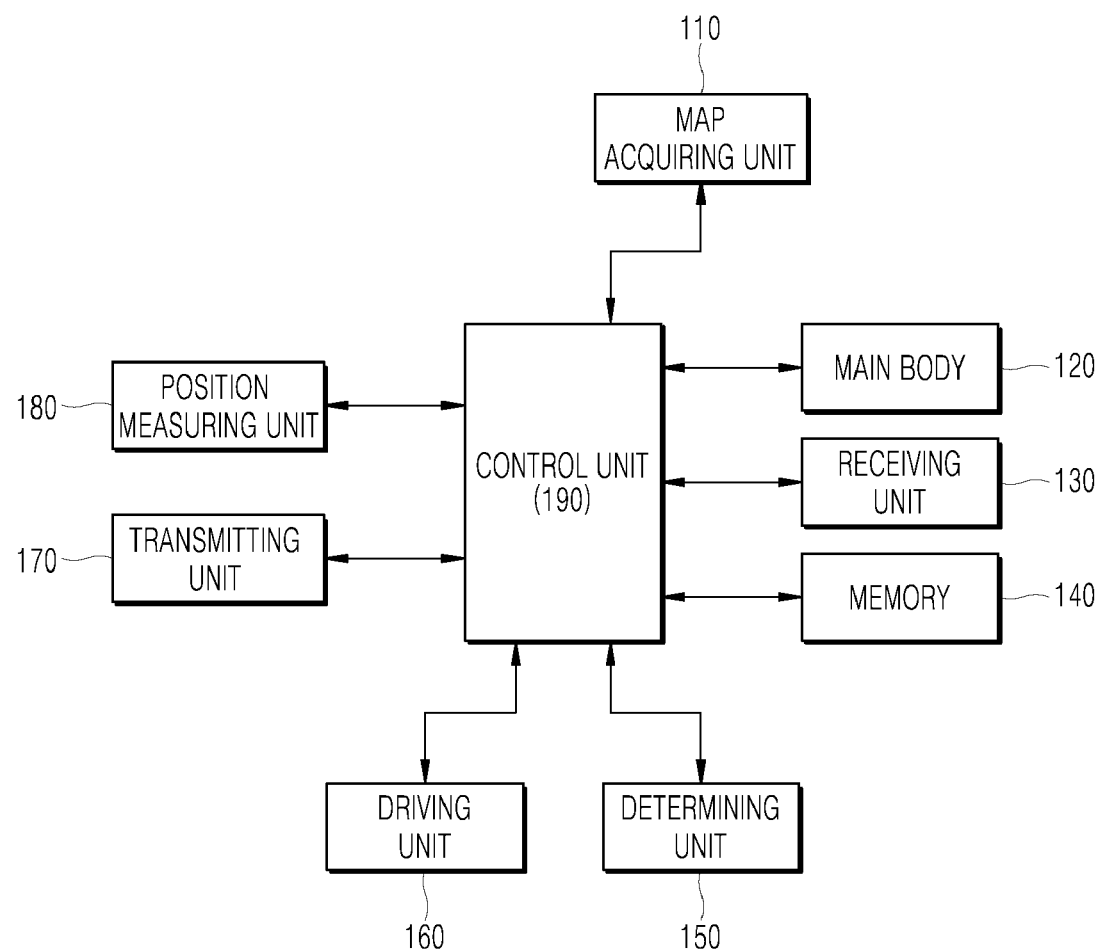
FIG. 2 is a schematic block diagram illustrating a configuration of a mobile robot, according to an embodiment of the present disclosure.
Figure 3:
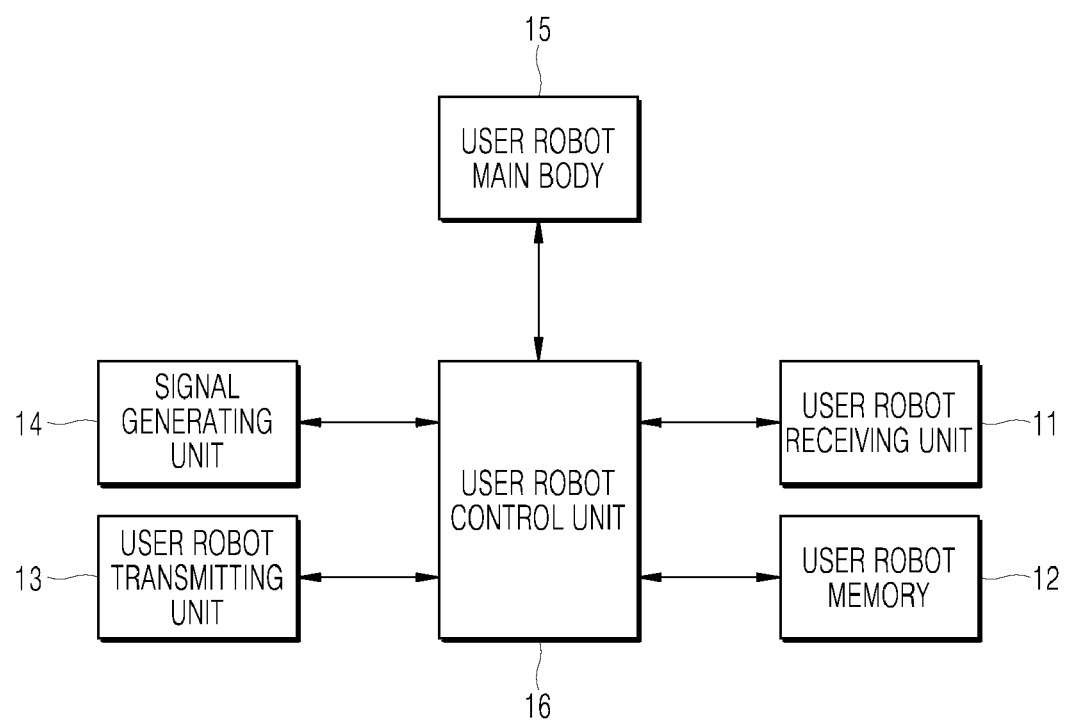
FIG. 3 is a schematic block diagram illustrating a configuration of a user robot, according to an embodiment of the present disclosure.
Figure 4:
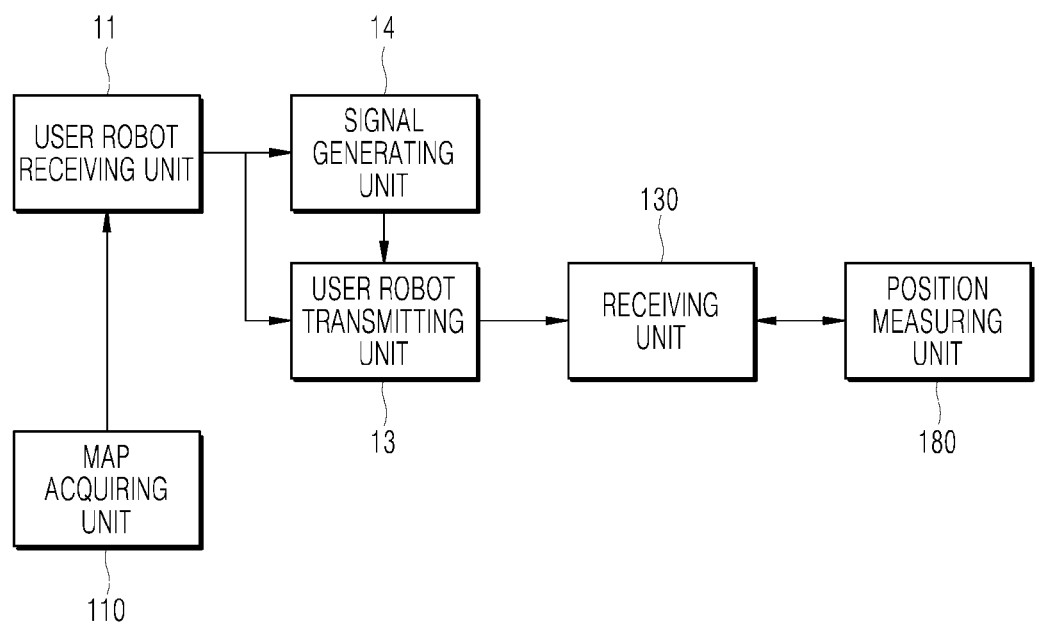
FIG. 4 is a schematic block diagram illustrating an interaction between a configuration of a mobile robot and a configuration of a user robot, according to an embodiment of the present disclosure.

FIGS. 1A and 1B are diagrams illustrating an embodiment in which a mobile robot and a user robot are implemented, according to an embodiment of the present disclosure. FIG. 2 is a schematic block diagram illustrating a configuration of a mobile robot, according to an embodiment of the present disclosure. FIG. 4 is a schematic block diagram illustrating an interaction between a configuration of a mobile robot and a configuration of a user robot, according to an embodiment of the present disclosure.

Although a mobile robot according to an embodiment of the present disclosure will be described, for example, as an autonomously moving cleaning robot, it is needless to say that the mobile robot may be operated in semi-autonomous or manual modes in addition to autonomous mode. In addition, the mobile robot capable of machine learning and autonomous moving according to an embodiment of the present disclosure may be any one of robots that may be operated in autonomous or semi-autonomous modes in addition to a cleaning robot.

A mobile robot 100 according to an embodiment of the present disclosure may suction an object, such as dust and garbage, located in front of the mobile robot 100 while moving along a movement route.

The mobile robot 100 may suction foreign matter and dust while moving along a predetermined movement route.

In addition, although a user robot 10 according to an embodiment of the present disclosure will be described, for example, as a cleaning device operated by a user, the user robot may be any one of a plurality of manual devices that are moved in a movement space by the user.

The user robot 10 of an embodiment of the present disclosure may suction, for example, garbage, foreign matter, and dust, in the movement space. Here, since the user does not move the user robot 10 in a consistent direction while cleaning, it is difficult to evenly clean the movement space.

In order to address this limitation, in an embodiment of the present disclosure, the autonomous mobile robot 100 may acquire a map M (see FIG. 5) of the movement space, and transmit the acquired map M of the movement space to the user robot 10. Thereafter, in a state in which the map M is stored, after the movement space is cleaned with the user robot 10 by the user, a space that has not been cleaned in the movement space is extracted, in response to the acquired map M. The information on the extracted space that has not been cleaned by the user robot 10 is transmitted to the mobile robot 100, and based on the received information, the mobile robot 100 suctions foreign matter, garbage, and dust while moving in the space that has not been cleaned by the user robot 10. As such, the space that did not get cleaned due to an obstacle or due to the user failing to notice the space may be cleaned by the autonomous mobile robot 100, such that the movement space may be cleaned entirely.

As such, the autonomous mobile robot 100 may include a main body 120 forming an outer shape of the mobile robot 100; a driving unit 160 mounted on the main body 120 to move the main body 120; a receiving unit 130 configured to receive the information on a moving history of the user robot 10 that has previously moved in the movement space; a memory 140 in which map information of the movement space is stored; and a control unit 190 configured to communicate with the receiving unit 130, the memory 140, and the driving unit 160 to control the main body 120.

Here, the map information of the movement space may be previously formed and transmitted to the mobile robot 100 or may be formed through information acquired using various sensors while the mobile robot 100 moves in the movement space.

To this end, the mobile robot 100 may include a map acquiring unit 110 that may acquire the map information of the movement space while the main body 120 moves in the movement space, which will be described later.

The map information acquired by the map acquiring unit 110 may be transmitted to the user robot 10. To this end, the mobile robot 100 includes a transmitting unit 170 that may transmit the map information to the user robot 10.

The main body 120 may be in the form of any one of various shapes such as a circular shape, and a polygonal shape, and the shape of the main body 120 may change according to conditions.

In addition, the main body 120 may include a suction unit 122 capable of suctioning, for example, dust and foreign matter, and the main body 120 may further include a suction device (not shown) and a dust collecting container capable of collecting the suctioned dust, in order to suction, for example, dust and foreign matter through the suction unit 122.

In addition, the main body 120 includes a battery. The battery is a configuration for supplying power required for overall operation of the mobile robot 100 in addition to the driving unit 160, which will be described later. Such a battery may be charged in a charging station when the remaining battery level is measured to be less than a predetermined reference value. Here, the battery reference value may be stored in the memory 140, and when the remaining stored battery level is less than the reference value, the control unit 190 may cause the driving unit 160 to move the mobile robot 100 to the charging station.

To this end, the mobile robot 100 is configured to include an algorithm that allows the mobile robot 100 to return to the charging station at an appropriate time and allows the mobile robot 100 to detect the position of the charging station while returning.

The main body 120 may include a photographing unit 124 for photographing, for example, videos and images of a plurality of items such as furniture and objects, placed in a movement space S, in order to acquire the map information. The photographing unit 124 may be, for example, a video sensor or a camera, and the video or image photographed by the photographing unit 124 may be stored in the memory 140.

The photographing unit 124 may be a camera capable of photographing an external object. The image of the object photographed by the photographing unit 124 is stored in the memory 140 and may be image data for determining whether movement of the main body 120 is possible in a moving area in which the mobile robot 100 should move.

In addition, the main body 120 may include a sensor (not shown) capable of measuring, for example, placement positions of various items placed in the movement space and the shape of the movement space to acquire the map information of the movement space.

The sensor may be any one of a distance sensor and a collision sensor, and the sensor may generate information on the items placed in the movement space, using, for example, the distance between the main body 120 and the item, or a collision between the main body 120 and the item, as measured by the sensor.

The driving unit 160 is configured for rotating and moving the main body 120 to cause the mobile robot 100 to move. Specifically, the driving unit 160 may include at least one driving wheel. The driving wheel may be installed on one side of the main body 120, but the conditions under which the driving wheel is installed may change according to the configuration of the mobile robot 100. In addition, the main body 120 or the driving unit 160 may include a separate driving motor for the driving wheel and may be driven by the driving motor.

The condition for moving the mobile robot 100 is established before the mobile robot 100 moves via the driving unit 160. An embodiment of the present disclosure will describe, for example, that the mobile robot 100 moves around an area that has not been cleaned with the user robot 10 by the user to clean the movement space.

To this end, information on the moving history of the user robot 10 that has previously cleaned the movement space is needed. The information on the moving history of the user robot 10 may be received by the receiving unit 130 mounted on the mobile robot 100.

Specifically, the receiving unit 130 may receive information on the moving history of the user robot 10 that has been cleaning the movement space when the user robot 10 is moved by the user in the movement space.

The receiving unit 130 receiving the moving history of the user robot 10 will be specifically described. The receiving unit 130 may receive a movement stoppage status of the user robot 10 based on the map information acquired by the map acquiring unit 110.

The movement stoppage status indicates that the user robot 10 is not cleaning. Specifically, this means that the user is not operating the user robot 10 and that moving history is no longer being generated.

When the movement stoppage status of the user robot 10 occurs and is received by the receiving unit 130, the position of the user robot 10 may be measured based on the received movement stoppage status.

The mobile robot 100 further includes a position measuring unit 180 for measuring the position of the user robot 10. Specifically, the position measuring unit 180 may establish a position where the moving of the mobile robot 100 starts on the map, based on the movement stoppage status of the user robot 10.

Based on the measured moving area information, the control unit 190 may control the driving unit 160 based on the moving history of the user robot 10 and the map information of the movement space stored in the memory 140.

For example, the control unit 190 may cause the driving unit 160 to move the main body 120 to an area with no moving history of the user robot 10, the area that the movement stoppage status of the user robot 10 had occurred.

Specifically, the moving history of the user robot 10 received by the receiving unit 130 may be assumed to be information on an area that the user robot 10 has cleaned, and the movement stoppage status of the user robot 10 may be referred to as a history of the user robot 10 not moving (in other words, not cleaning). The generated movement stoppage status of the user robot 10 may be compared with the map information to extract an area that has not been cleaned. The extracted area that has not been cleaned may be referred to as a moving area B (see FIG. 5).

Here, the moving area may be extracted by, for example, a method that indicates, on the entire map, the route along which the user robot 10 has moved, or excludes the route along which the user robot 10 has moved and only indicates an area in which the user robot 10 has not moved.

Assuming that the extracted moving area is an area that has not been cleaned by the user robot 10, it may be determined that the moving area is an area that the mobile robot 100 will clean. Accordingly, the control unit 190 may cause the driving unit 160 to move the mobile robot 100 to the moving area and clean by suctioning, for example, foreign matter and dust in the vicinity.

The memory 140 may store a machine learning model trained using a data set labeled for obstacles that restrict the movement of the main body 120. That is, even when the information on the moving area is received by the receiving unit 130 and the mobile robot 100 is moved to the moving area, when an obstacle such as furniture or an object is placed in the moving area, it is difficult for the mobile robot 100 to move. Therefore, in order for the mobile robot 100 to move while avoiding the obstacle, an artificial intelligence algorithm is applied, wherein the machine learning model trained using the data set labeled for obstacles is stored in the artificial intelligence algorithm. Thus, when the mobile robot 100 is adjacent to the obstacle, the mobile robot 100 may avoid the obstacle, based on the stored data set.

Based on this, it should be determined whether the moving area is a movement route along which the main body 120 may move. To this end, the mobile robot 100 may further include a determining unit 150. When the determining unit 150 determines that an obstacle is detected in the movement route, the movement of the main body 120 or mobile robot 100 along the movement route may be limited.

Specifically, the determining unit 150 may determine a movement route along which the main body 120 may move in the moving area by inputting an image of an external object photographed by the photographing unit 124 into the machine learning model. That is, the algorithm may be set such that, when the external object in the image is an obstacle, a route having the obstacle is determined as a movement route that is not possible, thereby limiting the movement of the main body 120.

Meanwhile, artificial intelligence (AI) described in the embodiments of the present disclosure is an area of computer engineering science and information technology that studies methods to make computers mimic intelligent human behaviors such as reasoning, learning, and self-improving.

In addition, artificial intelligence does not exist on its own, but is rather directly or indirectly related to a number of other fields in computer science. In recent years, there have been numerous attempts to introduce an element of AI into various fields of information technology to solve problems in the respective fields.

Machine learning is an area of artificial intelligence that includes the field of study that gives computers the capability to learn without being explicitly programmed. More specifically, machine learning is a technology that investigates and builds systems, and algorithms for such systems, which are capable of learning, making predictions, and enhancing their own performance on the basis of experiential data. Machine learning algorithms, rather than only executing rigidly-set static program commands, may be used to take an approach that builds models for deriving predictions and decisions from inputted data.

As described above, the mobile robot 100 moved by the driving unit 160 may acquire the map information of the movement space, and the acquired map information may be stored in the memory 140. In addition, the memory 140 in which the map information is stored may store, for example, a plurality of items placed in the movement space photographed by the photographing unit 124 and the shape of the movement space as images or videos.

In addition, obstacles, such as furniture, objects, and pillars in a building, that should be avoided when the mobile robot 100 moves may be previously learned and stored in the memory 140. Thus, when an obstacle is detected in the moving area, the mobile robot 100 may avoid the detected obstacle while moving.

As such, the moving history of the user robot 10 moved by the user may be a basis in order for the mobile robot 100 to clean while moving in the movement space. Hereinafter, the user robot 10 will be described with reference to FIGS. 1A to 4 again.

The user robot 10 may be a cleaning device operated by a user as described above. For example, the user robot 10 may be a wired vacuum cleaner, a wireless vacuum cleaner, and a hand vacuum cleaner, and hereinafter, a wireless vacuum cleaner (see FIG. 1B) will be described as an example in the embodiment of the present disclosure.

The user robot 10 includes a user robot main body 15 that moves in the movement space. The user robot main body 15 may be formed in the shape of a bar, as shown in FIG. 1B, but the present disclosure is not limited by the shape of the user robot main body 15.

In addition, the user robot 10 includes a user robot receiving unit 11, wherein the user robot receiving unit 11 may receive the map information that is acquired by the mobile robot 100 while moving in the movement space autonomously.

The received map information may be stored in a user robot memory 12. Here, the user robot memory 12 may also store the moving history of the user robot 10 that has cleaned the movement space.

As such, the moving history of the user robot 10 is stored in the user robot memory 12, and when it is determined that the movement of the user robot 10 has stopped, the stored moving history of the user robot 10 may be transmitted to the mobile robot 100 via a user robot transmitting unit 13.

Here, whether or not the movement of the user robot 10 has stopped may be determined according to a predefined condition. Here, the predefined condition denotes whether or not a movement stoppage status of the user robot 10 continues for more than a predetermined period of time. That is, it may be determined that the movement of the user robot 10 has stopped when certain information, such as information on the movement of the user robot 10 not occurring for more than a predetermined period of time or information on vibration in the user robot main body 15 not being generated for more than a predetermined period of time when a user robot suction unit 18 suctions foreign matter or dust, is generated through a motion sensor (not shown) mounted on the user robot 10.

The condition for the movement stoppage status of the user robot 10 may be whether or not the movement stoppage of the user robot 10 continues for more than a predetermined period of time from a specific time point. That is, when the moving history of the user robot 10 does not occur for more than a predetermined period of time from a specific time point, it may be determined that the user robot 10 has finished the cleaning of the movement space. For example, when it is determined that the moving history of the user robot 10 does not occur for more than 10 minutes, it is determined that the user is not cleaning the movement space using the user robot 10.

As such, when it is determined that the action of the user robot 10 has been completed, the information on the movement stoppage status of the user robot 10, which is to be transmitted to the mobile robot 100, may be generated through a signal generating unit 14. Here, the signal generating unit 14 may generate the information on the moving area where the movement stoppage status of the user robot 10 had occurred.

Hereinafter, the information on the moving area generated by the signal generating unit 14 may be transmitted to the receiving unit 130 of the mobile robot 100 via the user robot transmitting unit 13, and the mobile robot 100 may move based on the information on the moving area received by the receiving unit 130.

In some implementations, the controllers 190 may include one or more processors. In some implementations, the units 110-180 may correspond to the one or more processors. In some implementations, the units 110-180 may correspond to software components configured to be executed by the one or more processors.

As a result, when the mobile robot 100 acquires the map information of the movement space, the acquired map information may be transmitted to the user robot 10. After the user robot 10, having received the map information, cleans while moving in the movement space, the information on an area that the user has cleaned or information on an area that could not be cleaned or has not been cleaned are transmitted to the mobile robot 100. Here, the area that could not be cleaned or has not been cleaned by the user robot 10 is referred to as a moving area, and the mobile robot 100 cleans the area that has not been cleaned while moving in the moving area.

Here, when an obstacle is placed in the moving area, the mobile robot 100 may move while avoiding the obstacle according to previously learned conditions. That is, the moving area may be divided into a cleanable space and a non-cleanable space, based on the data set for obstacles stored in the memory 140 of the mobile robot 100. More specifically, when furniture such as a dining table and a chair is placed in a space, it is determined that there is a space (a space below the dining table or a space below chair legs) in which the mobile robot 100 may move, and the space may be classified as the cleanable space and stored in the memory 140 of the mobile robot 100. When the entire surface of the moving area is blocked with objects, the space may be determined to be the non-cleanable space and may be stored in the memory 140 of the mobile robot 100 for the mobile robot 100 to avoid.

An embodiment for cleaning a movement space through an interaction between the user robot 10 and the mobile robot 100 will now be described with reference to FIGS. 5 and 6.

Figure 5:
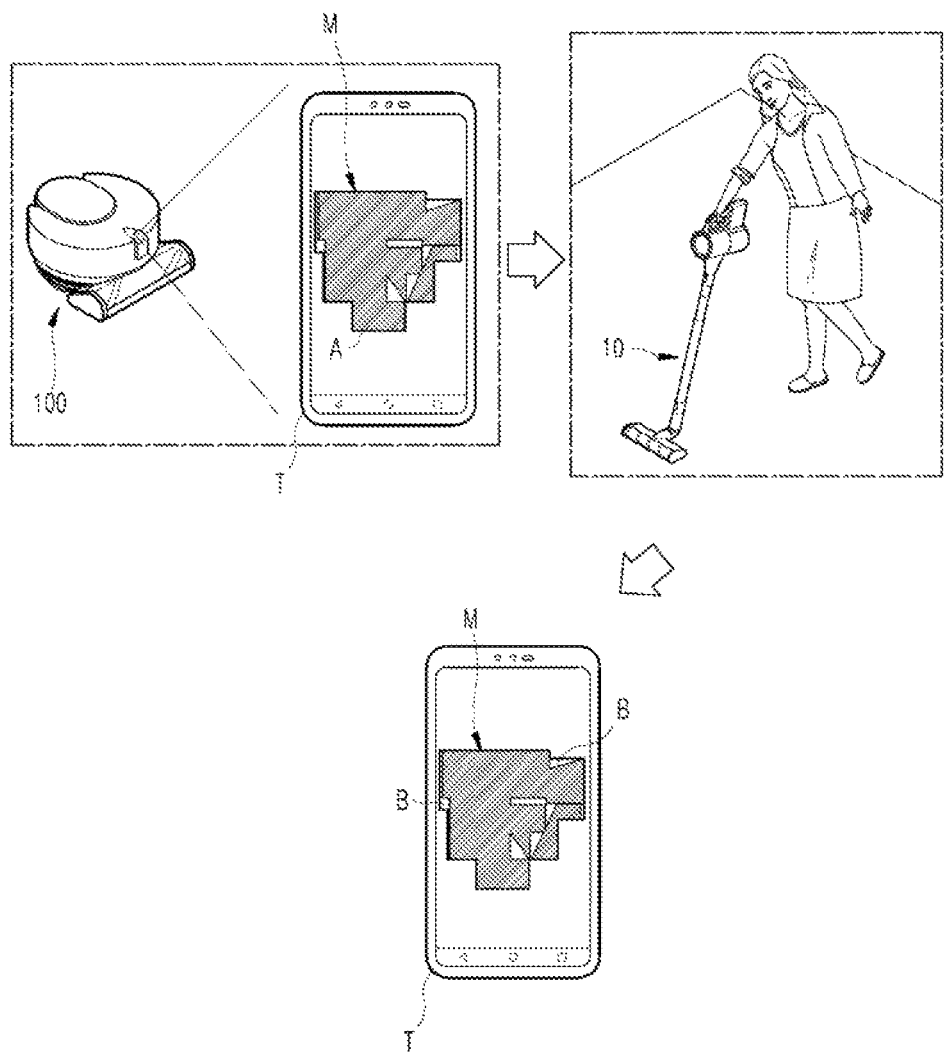
FIG. 5 is a diagram illustrating an embodiment in which, after a mobile robot acquires a movement space map and a user robot moves in the movement space, an area in which the user robot has not moved is shown on the map, according to an embodiment of the present disclosure.
Figure 6:
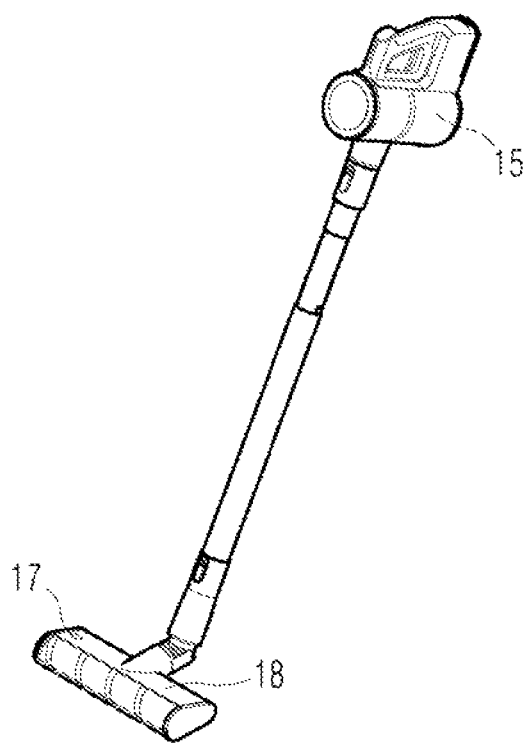
FIG. 6 is a diagram illustrating a modification of a user robot, according to an embodiment of the present disclosure.

FIG. 5 is a diagram illustrating an embodiment in which, after a mobile robot acquires a movement space map and a user robot moves in the movement space, an area in which the user robot has not moved is shown on the map, according to an embodiment of the present disclosure, and FIG. 6 is a diagram illustrating a modification of a user robot, according to an embodiment of the present disclosure. Hereinafter, a description of the common parts previously described with reference to FIGS. 1A to 4 will be omitted.

Referring to FIG. 5, the mobile robot 100 acquires a map M of the movement space while moving in the movement space. Here, the acquired map M may be transmitted to any media capable of communicating with the mobile robot 100, such as a user terminal, a wearable device, and a tablet PC, and hereinafter, the transmission of the map to the user terminal T will be described as an example.

To this end, to connect with the terminal T, the mobile robot 100 may include a device that includes hardware and software required for transmission and reception of signals, such as control signals and data signals, with another network device via wired or wireless connections.

Here, the network may include connections of network elements such as hubs, bridges, routers, switches, and gateways. The network may include a public network such as the Internet and a private network such as a secured private network of an organization, and may also include one or more connected networks, for example, a multi-network environment. Access to the network may be provided via one or more wired or wireless access networks. Further, the network may support 5G communication and an Internet of things (IoT) network for exchanging and processing information between distributed components such as objects.

The map M of the movement space acquired through the photographing unit 124 of the mobile robot 100 may be transmitted to the user robot 10. In a state in which the map M of the movement space is stored, the user cleans the movement space while moving the user robot 10. Here, an area A that the user robot 10 has cleaned may be stored in the map information.

When the user cleans the movement space by moving the user robot 10, an area B that the user robot 10 has not cleaned may be extracted. The information on the extracted area B that the user robot 10 has not cleaned may be transmitted to the mobile robot 100, and at the same time, may be displayed on the user terminal T.

Based on the information on the area B that the user robot 10 has not cleaned, which has been transmitted to the mobile robot 100, the mobile robot 100 may clean the area B that has not been cleaned.

Therefore, the mobile robot 100 performs additional cleaning of the area that the user did not notice so that the movement space may be cleaned entirely.

When the user robot 10 cleans the movement space, a frequently missed area may occur due to the user failing to recognize the area. To address such an issue, it is possible to transmit the information on the frequently missed area to the user terminal T so that the user may recognize the frequently missed area. Here, since the user terminal T is connected to the user robot 10 via the network, the user robot 10 may recognize the information on the frequently missed area which has been transmitted to the user terminal T. Thus, the user robot 10 may be provided with a notification unit 17 in order to directly inform the user of the information on the frequently missed area. Specifically, when the user moves the user robot 10 around the frequently missed area, it is determined by the user terminal T that the position of the user robot 10 is close to the frequently missed area, and the notification unit 17 is operated based on the determined information.

The notification unit 17 may be implemented as any one of an LED device that may display a flicker or a device that may produce a sound.

Alternatively, the information on the area frequently missed by the user may be stored in the mobile robot 100. That is, after the user robot 10 finishes cleaning, the mobile robot 100 receives all the information on the area B that should be cleaned and the frequently missed area. Thus, the mobile robot 100 moves to clean both the area B that should be cleaned and the frequently missed area.

A specific embodiment in which a movement space may be cleaned using the mobile robot 100 and the user robot 10 will be described with reference to the following drawings.

Figure 7:
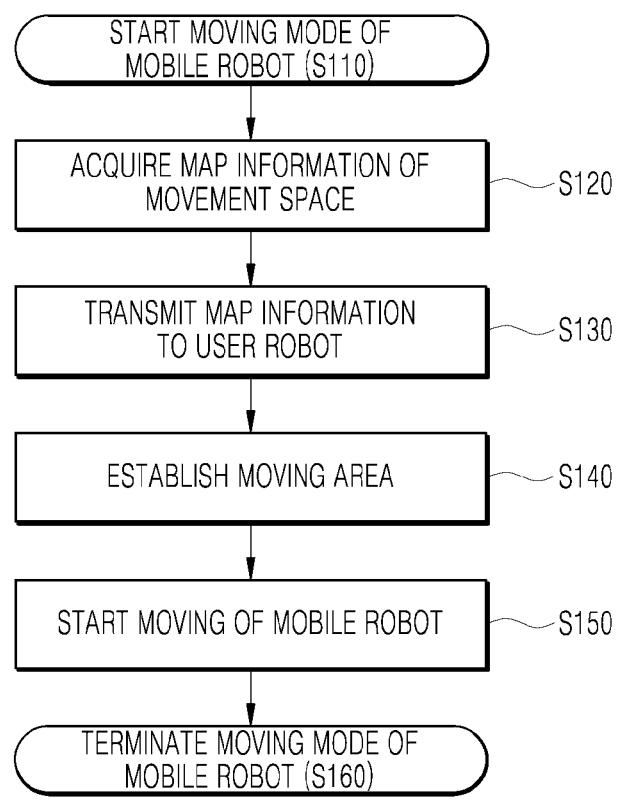
FIG. 7 is a flowchart illustrating a moving process of a mobile robot, according to an embodiment of the present disclosure.
Figure 8:
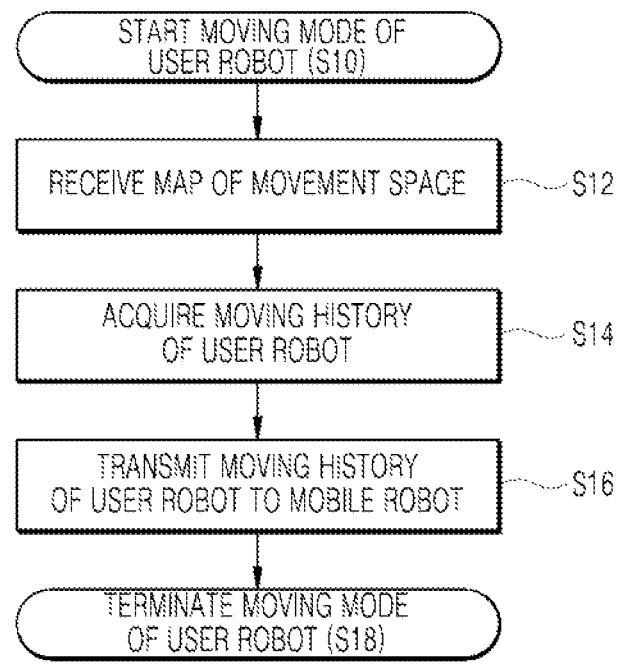
FIG. 8 is a flowchart illustrating a moving process of a user robot, according to an embodiment of the present disclosure.
Figure 9:
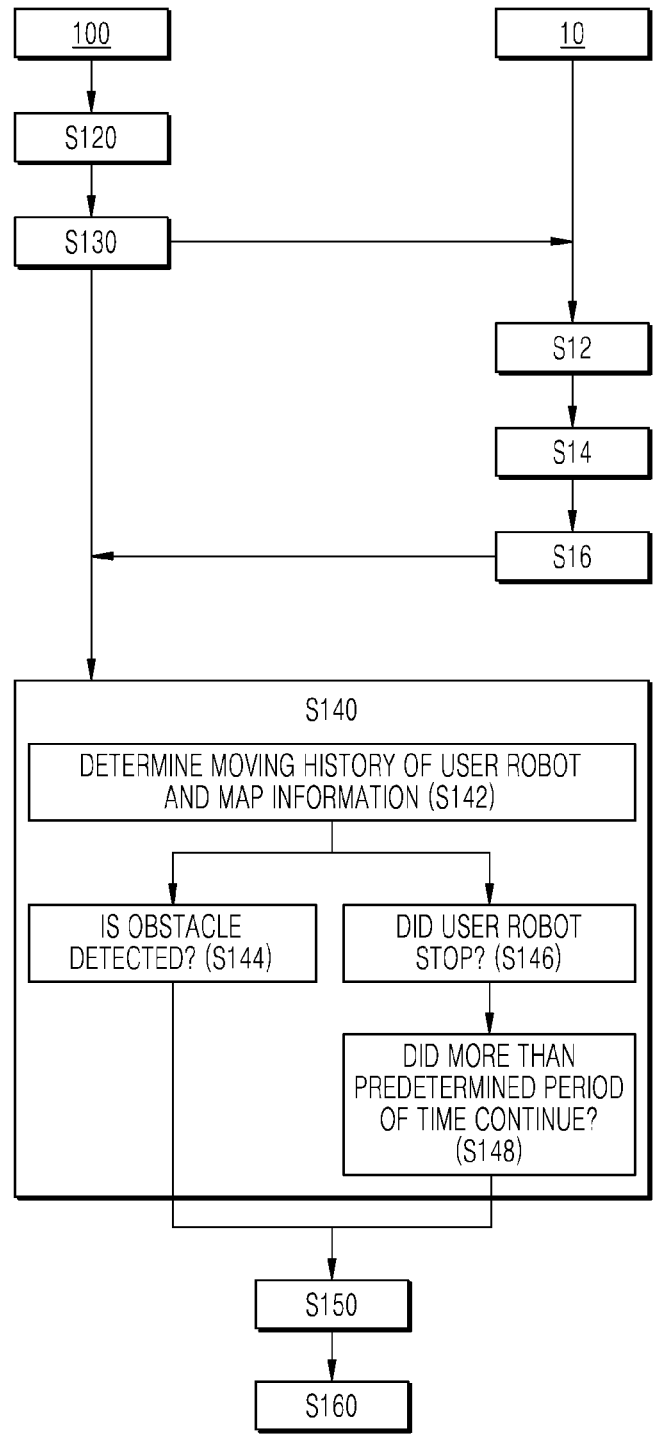
FIG. 9 is a schematic flowchart illustrating a moving process of a mobile robot in a movement space through an interaction between the mobile robot and a user robot, according to an embodiment of the present disclosure.

FIG. 7 is a flowchart illustrating a moving process of a mobile robot, according to an embodiment of the present disclosure; FIG. 8 is a flowchart illustrating a moving process of a user robot according to an embodiment of the present disclosure; and FIG. 9 is a schematic flowchart illustrating a moving process of a mobile robot in a movement space, through interaction between the mobile robot and a user robot, according to an embodiment of the present disclosure. Hereinafter, a description of the common parts previously described with reference to FIGS. 1A to 6 will be omitted.

To start a moving mode of the mobile robot 100, the mobile robot 100 may first acquire map information of a movement space in which the mobile robot 100 moves (S110 and S120). The acquired map information may be stored in the memory 140 mounted in the mobile robot 100. Here, the map information of the movement space may be previously formed and transmitted to the mobile robot 100 or may be formed through information acquired using various sensors while the mobile robot 100 moves in the movement space.

The map information of the movement space stored in the memory 140 may be transmitted to the user robot 10 (S130). After the map information is transmitted to the user robot 10 and the user robot 10 receives and stores the map information, the user robot 10 may clean the movement space while moving in the movement space. As a result of the user robot 10 cleaning the movement space, the moving history of the user robot 10 may be generated, and the generated moving history of the user robot 10 may be transmitted to the mobile robot 100.

The moving history of the user robot 10 is information on the area that the user robot 10 has cleaned. The moving history of the user robot 10 may be compared and cross-referenced with the map information acquired by the mobile robot 100, and thus the mobile robot 100 may determine an area that has not been cleaned by the user robot 10, in other words, receive a movement stoppage status of the user robot 10, based on the map information.

The movement stoppage status of the user robot 10 may be determined to be an area that the mobile robot 100 should clean. That is, the moving area of the mobile robot 100 may be established based on the movement stoppage status of the user robot 10 (S140).

Here, the beginning of the moving area may be established on the map M based on the received movement stoppage status of the user robot 10. That is, the movement starting point of the mobile robot 100 may be established so that the mobile robot 100 moves from the position where the movement of the user robot 10 has stopped.

When establishing the moving area of the mobile robot 100, the moving history of the user robot 10 and the map information may be determined (S142). As described above, the moving history of the user robot 10 is compared and cross-referenced with the map information acquired by the mobile robot 100, and thus, based on the map information, an area that has not been cleaned by the user robot 10 is determined.

Thereafter, when an area that should be cleaned by the mobile robot 100 is determined, it may be determined whether an obstacle is detected in the area that should be cleaned (S144). An obstacle may be, for example, furniture, and objects, and the determining of the obstacle may be performed according to a previously learned data set. For an area where it is determined that an obstacle is detected, the movement of the mobile robot 100 is restricted to prevent a collision between the mobile robot 100 and the obstacle.

When the moving history of the user robot 10 and the map information are determined at the time of establishing the moving area of the mobile robot 100, it may be determined whether the movement stoppage status of the user robot 10 occurs (S146).

The movement stoppage status of the user robot 10 is a condition for transmitting the moving history of the user robot 10 during the transmitting the moving history of the user robot 10 to the mobile robot 100 (S16) as described later.

That is, when the movement stoppage status of the user robot 10 occurs according to a predefined condition and the mobile robot 100 receives the information on the movement stoppage status of the user robot 10, the moving area of the mobile robot 100 may be established.

Here, the predefined condition may be whether the user robot 10 does not move in the moving area for more than a predetermined period of time. For example the predefined condition may be whether the motor of the user robot 10 does not react for more than a predetermined period of time, or whether the user robot suction unit 18 of the user robot 10 suctions no dust or foreign matter for more than a predetermined period of time.

After the moving area of the mobile robot 100 is established, the mobile robot 100 may autonomously move along the established moving area (S150). The area where the movement stoppage status of the user robot 10 had occurred, that is, the area that has not been cleaned, is cleaned autonomously by the mobile robot 100, thereby performing complete cleaning of the movement space. Accordingly, the moving mode of the mobile robot 100 may be terminated (S160).

The user robot 10 receives the map information of the movement space acquired by the mobile robot 100 before moving in the movement space (S10 and S12).

The user robot 10 having received the map information of the movement space acquires the moving history while being moved by the user in the movement space (S14). The moving history acquired by the user robot 10 may be information on an area that has been cleaned by the user robot 10.

The acquired moving history of the user robot 10 may be transmitted to the mobile robot 100 (S16). The moving area of the mobile robot 100 may be established by the received moving history of the user robot 10.

Here, the user robot 10 may transmit the moving history to the mobile robot 100 in real time, or may transmit the moving history to the mobile robot 100 when the movement of the user robot 10 stops.

In this case, when the movement stoppage status of the user robot 10 occurs according to a predefined condition, the moving history of the user robot 10 is transmitted to the mobile robot 100. The predefined condition for causing the movement stoppage status of the user robot 10 may be whether the user robot 10 does not move in the moving area for more than a predetermined period of time. For example, the predefined condition may be whether the motor of the user robot 10 does not react for more than a predetermined period of time, or whether the user robot suction unit 18 of the user robot 10 suctions no dust or foreign matter for more than a predetermined period of time.

As such, when the movement stoppage status of the user robot 10 occurs according to the predefined condition, the information on the position of the user robot 10, which is where the movement stoppage status of the user robot 10 had occurred, may be transmitted to the mobile robot 100. The transmitted information on the position of the user robot 10 may be a reference for the mobile robot 100 to start moving.

As such, when the moving history of the user robot 10 is transmitted to the mobile robot 100, the moving mode of the user robot 10 is terminated (S18).

The example embodiments described above may be implemented through computer programs executable through various components on a computer, and such computer programs may be recorded in computer-readable media. Examples of the computer-readable media include, but are not limited to: magnetic media such as hard disks, floppy disks, and magnetic tape; optical media such as CD-ROM disks and DVD-ROM disks; magneto-optical media such as floptical disks; and hardware devices that are specially configured to store and execute program codes, such as ROM, RAM, and flash memory devices.

The computer programs may be those specially designed and constructed for the purposes of the present disclosure or they may be of the kind well known and available to those skilled in the computer software arts. Examples of program code include both machine code, such as produced by a compiler, and higher level code that may be executed by the computer using an interpreter.

As used in the present application (especially in the appended claims), the terms "a/an" and "the" include both singular and plural references, unless the context clearly states otherwise. Also, it should be understood that any numerical range recited herein is intended to include all sub-ranges subsumed therein (unless expressly indicated otherwise) and therefore, the disclosed numeral ranges include every individual value between the minimum and maximum values of the numeral ranges.

Also, the order of individual steps in process claims of the present disclosure does not imply that the steps must be performed in this order; rather, the steps may be performed in any suitable order, unless expressly indicated otherwise. In other words, the present disclosure is not necessarily limited to the order in which the individual steps are recited. Further, the steps included in the methods according to the present disclosure may be performed through the processor or modules for performing the functions of the step. All examples described herein or the terms indicative thereof ("for example", etc.) used herein are merely to describe the present disclosure in greater detail. Therefore, it should be understood that the scope of the present disclosure is not limited to the example embodiments described above or by the use of such terms unless limited by the appended claims. Also, it should be apparent to those skilled in the art that various alterations, substitutions, and modifications may be made within the scope of the appended claims or equivalents thereof.

The present disclosure is thus not limited to the example embodiments described above, and rather intended to include the following appended claims, and all modifications, equivalents, and alternatives falling within the spirit and scope of the following claims.

What is claimed is:

1. A mobile robot comprising:
   a driving unit configured to move the mobile robot;
   a receiver configured to receive movement history information of a user robot in a movement space;
   a memory configured to store map information of the movement space; and
   one or more controllers configured to:
   determine at least one area in the movement space for moving the mobile robot based on the received movement history information of the user robot;
   receive, via the receiver, a movement stoppage status of the user robot based on the map information; and
   determine a start location on the map information for moving the mobile robot based on the received movement stoppage status of the user robot.

2. The mobile robot of claim 1, wherein the one or more controllers are further configured to cause the driving unit to move the mobile robot to the determined at least one area in the movement space, wherein the at least one area corresponds to areas of the movement space where the user robot was not moved.

3. The mobile robot of claim 1, further comprising a camera, wherein the one or more controllers are further configured to:
   input an image captured by the camera to a machine learning model stored in the memory, wherein the machine learning model is trained to recognize obstacles for movement of the mobile robot;
   determine a movement route of the mobile robot based on an output of the machine learning model; and
   control the driving unit to move the mobile robot according to the determined movement route.

4. The mobile robot of claim 1, wherein the one or more controllers are configured to:
   acquire the map information of the movement space based on movement of the mobile robot in the movement space; and
   transmit the map information to the user robot via a transmitter.

5. A user robot, comprising:
   a receiver configured to receive map information of a movement space from a mobile robot, wherein the map information is generated based on autonomous movement of the mobile robot in the movement space;
   a memory configured to store movement history of the user robot in the movement space based on the received map information; and
   a transmitter configured to transmit the movement history to the mobile robot when movement of the user robot is stopped according to a predefined condition.

6. The user robot of claim 5, wherein the predefined condition corresponds to the movement of the user robot being stopped for at least a threshold period of time.

7. The user robot of claim 6, wherein a signal indicating a movement stoppage status of the user robot is transmitted to the mobile robot.

8. The user robot of claim 7, wherein the signal further indicates a location in the movement space where the movement stoppage status of the user robot occurred.

9. A method for operating a mobile robot, the method comprising:
  storing map information of a movement space based on movement of the mobile robot in the movement space;
  transmitting the map information to a user robot operated by a user;
  receiving a movement stoppage status of the user robot including a movement history of the user robot in the movement space; and
  determining a start location for moving the mobile robot based on the received movement stoppage status of the user robot.

10. The method of claim 9, further comprising:
  detecting an obstacle in the movement space; and
  determining a movement route for the mobile robot based on a position of the detected obstacle.

11. The method of claim 10, wherein the obstacle is detected based on an output of a machine learning model configured to recognize obstacles for movement of the mobile robot using as input images of the movement space captured by the mobile robot.

12. The method of claim 9, wherein the start location is determined based on a position where the movement stoppage status of the user robot occurred.

13. The method of claim 9, further comprising moving the mobile robot to the start location when the movement stoppage status is maintained for at least a threshold period of time, wherein the start location corresponds to a location where the movement stoppage status of the user robot occurred.

14. A method for operating a user robot, the method comprising:
  receiving map information of a movement space from a mobile robot, wherein the map information is generated based on autonomous movement of the mobile robot in the movement space;
  storing movement history of the user robot in the movement space based on the received map information; and
  transmitting the movement history to the mobile robot when the movement of the user robot is stopped according to a predefined condition.

15. The method of claim 14, wherein the predefined condition corresponds to the movement of the user robot being stopped for at least a threshold period of time.

16. The method of claim 14, wherein a signal indicating a movement stoppage status of the user robot is transmitted to the mobile robot.

17. The method of claim 16, wherein the signal further indicates a location in the movement space where the movement stoppage status of the user robot occurred.

18. A mobile robot comprising:
  a driving unit configured to move the mobile robot;
  a receiver configured to receive movement history information of a user robot in a movement space;
  a memory configured to store map information of the movement space; and
  one or more controllers configured to:
  determine at least one area in the movement space for moving the mobile robot based on the received movement history information of the user robot;
  acquire the map information of the movement space based on movement of the mobile robot in the movement space; and
  transmit the map information to the user robot via a transmitter.

* * * * *